(12) United States Patent
Rossi et al.

(10) Patent No.: US 12,475,376 B2
(45) Date of Patent: Nov. 18, 2025

(54) GENERATING NODE EMBEDDINGS FOR MULTIPLE ROLES

(71) Applicant: Adobe Inc., San Jose, CA (US)

(72) Inventors: Ryan A. Rossi, San Jose, CA (US); Iftikhar Ahamath Burhanuddin, Bangalore (IN); Gautam Choudhary, Sri Ganganagar (IN); Fan Du, Milpitas, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 782 days.

(21) Appl. No.: 17/846,160

(22) Filed: Jun. 22, 2022

(65) Prior Publication Data

US 2023/0419115 A1 Dec. 28, 2023

(51) Int. Cl.
*G06N 3/082* (2023.01)

(52) U.S. Cl.
CPC ................... *G06N 3/082* (2013.01)

(58) Field of Classification Search
None
See application file for complete search history.

(56) References Cited

U.S. PATENT DOCUMENTS

| | | | | |
|---|---|---|---|---|
| 2019/0236464 A1* | 8/2019 | Feinson | ............ | G06N 3/006 |
| 2020/0035002 A1* | 1/2020 | Epasto | ............ | G06T 9/00 |
| 2021/0056428 A1* | 2/2021 | Palowitch | ............ | G06F 17/10 |
| 2022/0129793 A1* | 4/2022 | Sato | ............ | G06N 20/00 |
| 2022/0399007 A1* | 12/2022 | Jose | ............ | G06N 3/084 |
| 2023/0394283 A1* | 12/2023 | Pang | ............ | G16C 20/30 |

OTHER PUBLICATIONS

Abu-El-Haija, Sami, et al., "Learning Edge Representations via Low-Rank Asymmetric Projections", Cornell University arXiv, arXiv.org [retrieved May 3, 2022]. Retrieved from the Internet <https://arxiv.org/pdf/1705.05615.pdf>., Sep. 13, 2017, 10 pages.

Ahmed, Nesreen K, et al., "Edge Role Discovery via Higher-order Structures", Advances in Knowledge Discovery and Data Mining [retrieved May 3, 2022]. Retrieved from the Internet <http://ryanrossi.com/pubs/ahmed-et-al-pakdd17-preprint.pdf>., Apr. 23, 2018, 12 pages.

(Continued)

*Primary Examiner* — Richard L Bowen
(74) *Attorney, Agent, or Firm* — FIG. 1 Patents

(57) ABSTRACT

In implementations of systems for generating node embeddings for multiple roles, a computing device implements an embeddings system to cluster nodes of a graph into clusters. An initial role membership vector is computed for each of the nodes based on the clusters. The embeddings system generates a first set of role embeddings for a particular node of the nodes based on the initial role membership vector for the particular node and nodes connected to the particular node in the graph. The embeddings system determines an indication of at least one of a node classification or a link prediction for the graph based on the first set of role embeddings and a second set of role embeddings for an additional node of the nodes.

20 Claims, 7 Drawing Sheets

(56) References Cited

OTHER PUBLICATIONS

Ahmed, Nesreen K, et al., "Learning Role-based Graph Embeddings", Cornell University arXiv, arXiv.org [retrieved May 3, 2022]. Retrieved from the Internet <https://arxiv.org/pdf/1802.02896.pdf>., Jul. 2, 2018, 8 pages.

Chen, Zhengdao, et al., "On the equivalence between graph isomorphism testing and function approximation with GNNs", Cornell University arXiv, arXiv.org [retrieved May 3, 2022]. Retrieved from the Internet <https://arxiv.org/pdf/1905.12560.pdf>., May 29, 2019, 19 Pages.

Damke, Clemens, et al., "A Novel Higher-order Weisfeiler-Lehman Graph Convolution", Cornell University arXiv, arXiv.org [retrieved May 3, 2022]. Retrieved from the Internet <https://arxiv.org/pdf/2007.00346.pdf>., Sep. 21, 2020, 27 Pages.

Defferrard, Michael, et al., "Convolutional Neural Networks on Graphs with Fast Localized Spectral Filtering", 30th Conference on Neural Information Processing Systems (NIPS 2016) [online] [retrieved May 3, 2022]. Retrieved from the Internet <http://papers.nips.cc/paper/6081-convolutional-neural-networks-on-graphs-with-fast-localized-spectral-filtering.pdf>., Dec. 2016, 9 pages.

Du, Jian, et al., "Topology Adaptive Graph Convolutional Networks", Cornell University arXiv, arXiv.org [retrieved May 3, 2022]. Retrieved from the Internet <https://arxiv.org/pdf/1710.10370.pdf>., Feb. 11, 2018, 13 Pages.

Epasto, Alessandro, et al., "Is a Single Embedding Enough? Learning Node Representations that Capture Multiple Social Contexts", In The World Wide Web Conference (WWW '19). Association for Computing Machinery, New York, NY, USA [retrieved May 3, 2022]. Retrieved from the Internet <https://arxiv.org/pdf/1905.02138.pdf>., May 6, 2019, 11 pages.

Grover, Aditya, et al., "node2vec: Scalable Feature Learning for Networks", Cornell University arXiv, arXiv.org [retrieved May 4, 2022]. Retrieved from the Internet <https://arxiv.org/pdf/1607.00653.pdf>., Jul. 3, 2016, 10 pages.

Hamilton, William L, et al., "Inductive Representation Learning on Large Graphs", Cornell University arXiv, arXiv.org [retrieved May 4, 2022]. Retrieved from the Internet <https://arxiv.org/pdf/1706.02216.pdf>., Sep. 10, 2018, 19 Pages.

Henaff, Mikael, et al., "Deep Convolutional Networks on Graph-Structured Data", Cornell University arXiv, arXiv.org [retrieved May 4, 2022]. Retrieved from the Internet <https://arxiv.org/pdf/1506.05163.pdf>., Jun. 16, 2015, 10 pages.

Kingma, Diederik P, et al., "Adam: A Method for Stochastic Optimization", Cornell University, arXiv Preprint, arXiv.org [retrieved May 4, 2022]. Retrieved from the Internet <https://arxiv.org/pdf/1412.6980.pdf>., Jan. 30, 2017, 15 pages.

Kipf, Thomas N, et al., "Semi-Supervised Classification with Graph Convolutional Networks", Cornell University arXiv, arXiv.org [retrieved Sep. 7, 2022]. Retrieved from the Internet <https://arxiv.org/pdf/1609.02907.pdf>., Feb. 22, 2017, 14 pages.

Liu, Ninghao, et al., "Is a Single Vector Enough ?: Exploring Node Polysemy for Network Embedding", Cornell University arXiv, arXiv.org [retrieved May 4, 2022]. Retrieved from the Internet <https://arxiv.org/pdf/1905.10668.pdf>., May 25, 2019, 9 Pages.

Maron, Haggai, et al., "Provably Powerful Graph Networks", Cornell University arXiv, arXiv.org [retrieved May 4, 2022]. Retrieved from the Internet <https://arxiv.org/pdf/1905.11136.pdf>., Jun. 9, 2020, 15 Pages.

Monti, Federico, et al., "Geometric Deep Learning on Graphs and Manifolds Using Mixture Model CNNs", IEEE Ccvrp [retrieved May 4, 2022]. Retrieved from the Internet <https://web.archive.org/web/20180417011326id_/http://openaccess.thecvf.com:80/content_cvpr_2017/papers/Monti_Geometric_Deep_Learning_CVPR_2017_paper.pdf.>., Dec. 6, 2016, 14 Pages.

Morris, Christopher, et al., "Weisfeiler and Leman go sparse: Towards scalable higher-order graph embeddings", Cornell University arXiv, arXiv.org [retrieved May 4, 2022]. Retrieved from the Internet <https://arxiv.org/pdf/1904.01543.pdf>., Oct. 19, 2020, 30 Pages.

Pal, Aditya, et al., "PinnerSage: Multi-Modal User Embedding Framework for Recommendations at Pinterest", Cornell University arXiv, arXiv.org [retrieved May 4, 2022]. Retrieved from the Internet <https://arxiv.org/pdf/2007.03634.pdf>., Jul. 7, 2020, 10 pages.

Park, Chanyoung, et al., "Unsupervised Differentiable Multi-aspect Network Embedding", Proceedings of the 26th ACM SIGKDD International Conference on Knowledge Discovery & Data Mining [retrieved May 4, 2022]. Retrieved from the Internet <https://www.cs.emory.edu/~jyang71/files/asp2vec.pdf>., Aug. 20, 2020, 11 Pages.

Perozzi, Bryan, et al., "DeepWalk: Online Learning of Social Representations", Cornell University arXiv, arXiv.org [retrieved May 4, 2022]. Retrieved from the Internet <https://arxiv.org/pdf/1403.6652.pdf>., Jun. 27, 2014, 10 pages.

Qi, Charles R, et al., "PointNet: Deep Learning on Point Sets for 3D Classification and Segmentation", Cornell University arXiv, arXiv.org [retrieved May 4, 2022]. Retrieved from the Internet <https://arxiv.org/pdf/1612.00593.pdf>., Apr. 10, 2017, 19 pages.

Rossi, Ryan, et al., "Deep Inductive Graph Representation Learning", IEEE Transactions on Knowledge and Data Engineering, vol. 32, No. 3 [retrieved May 4, 2022]. Retrieved from the Internet <https://ieeexplore.ieee.org/stamp/ stamp.jsp?tp=&arnumber=8519335>., Nov. 1, 2018, 15 Pages.

Rossi, Ryan, et al., "On Proximity and Structural Role-based Embeddings in Networks: Misconceptions, Techniques, and Applications", Cornell University arXiv, arXiv.org [retrieved May 4, 2022]. Retrieved from the Internet https://arxiv.org/pdf/1908.08572.pdf>., Sep. 21, 2020, 36 Pages.

Rossi, Ryan A, et al., "Role Discovery in Networks", Cornell University arXiv, arXiv.org [retrieved May 4, 2022]. Retrieved from the Internet <https://arxiv.org/pdf/1405.7134.pdf>., Nov. 3, 2016, 20 pages.

Sen, Prithviraj, et al., "Collective Classification in Network Data", AI Magazine, vol. 29, No. 3 [retrieved May 4, 2022]. Retrieved from the Internet <https://ojs.aaai.org/index.php/aimagazine/article/view/2157>., Sep. 6, 2008, 14 Pages.

Tang, Jian, et al., "LINE: Large-scale Information Network Embedding", Cornell University arXiv, arXiv.org [retrieved May 4, 2022]. Retrieved from the Internet <https://arxiv.org/pdf/1503.03578.pdf>., Mar. 12, 2015, 11 pages.

Veličković, Petar, et al., "Graph Attention Networks", Cornell University arXiv, arXiv.org [retrieved May 4, 2022]. Retrieved from the Internet <https://arxiv.org/pdf/1710.10903.pdf>., Feb. 4, 2018, 12 Pages.

Wang, Minjie, et al., "Deep Graph Library: A Graph-Centric, Highly-Performant Package for Graph Neural Networks", Cornell University arXiv, arXiv.org [retrieved May 4, 2022]. Retrieved from the Internet <https://arxiv.org/pdf/1909.01315.pdf>., Aug. 25, 2020, 18 Pages.

Wang, Yue, et al., "Dynamic Graph CNN for Learning on Point Clouds", ACM Transactions on Graphics, vol. 38, No. 5 [retrieved May 4, 2022]. Retrieved from the Internet <https://par.nsf.gov/servlets/purl/10124348>., Oct. 10, 2019, 12 Pages.

Wu, Zonghan, et al., "A Comprehensive Survey on Graph Neural Networks", Cornell University arXiv, arXiv.org [retrieved May 4, 2022]. Retrieved from the Internet <https://arxiv.org/pdf/1901.00596.pdf>., Dec. 4, 2019, 22 Pages.

Wu, Felix, et al., "Simplifying Graph Convolutional Networks", Cornell University arXiv, arXiv.org [retrieved May 4, 2022]. Retrieved from the Internet <https://arxiv.org/pdf/1902.07153.pdf>., Jun. 20, 2019, 14 Pages.

Zhou, Jie, et al., "Graph Neural Networks: A Review of Methods and Applications", Cornell University arXiv, arXiv.org [retrieved May 4, 2022]. Retrieved from the Internet <https://arxiv.org/ftp/arxiv/papers/1812/1812.08434.pdf>., Jan. 27, 2021, 26 Pages.

\* cited by examiner

GENERATING NODE EMBEDDINGS FOR MULTIPLE ROLES

BACKGROUND

Noon A graph neural network is a type of neural network that is capable of effectively processing data describing graphs. Graphs are challenging data structures for non-graph neural networks to process because of their arbitrary size and complex topologies. One way that graph neural networks overcome these challenges is to simplify the complex topologies with embeddings. Embeddings are low-dimensional vector representations of high-dimensional information included in a graph such as relationships between nodes of the graph. By processing the low-dimensional embeddings, graph neural networks are trainable to accurately perform tasks such as link prediction or node classification for the graph.

SUMMARY

Techniques and systems for generating node embeddings for multiple roles are described. In one example, a computing device implements an embeddings system to cluster nodes of a graph into clusters. For example, the nodes of the graph represent objects, groups, entities, and/or devices and the nodes are connected by edges or links of the graph that represent relationships between the objects, groups, entities, and/or devices represented by the nodes.

The embeddings system computes an initial role membership vector for each of the nodes which indicates a cluster that contains each of the nodes. For example, the embeddings system leverages the initial role membership vector of each node to generate an initial role embedding for each of the nodes. In this example, the embeddings system uses a graph neural network to generate a set of role embeddings for each node in the graph based on information aggregated from nodes connected to each node in the graph, the initial role membership vectors, and the initial role embedding s.

For instance, a first set of role embeddings for a first node of the graph includes a different number of role embeddings than a second set of role embeddings for a second node of the graph. In one example, the first set of role embeddings is unique to the first node of the graph. In another example, a role embedding included in the first set of role embeddings is not included in any of the other sets of role embeddings for the nodes of the graph. For example, the graph neural network is trainable using the sets of role embeddings to perform tasks including link prediction and node classification for the graph.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
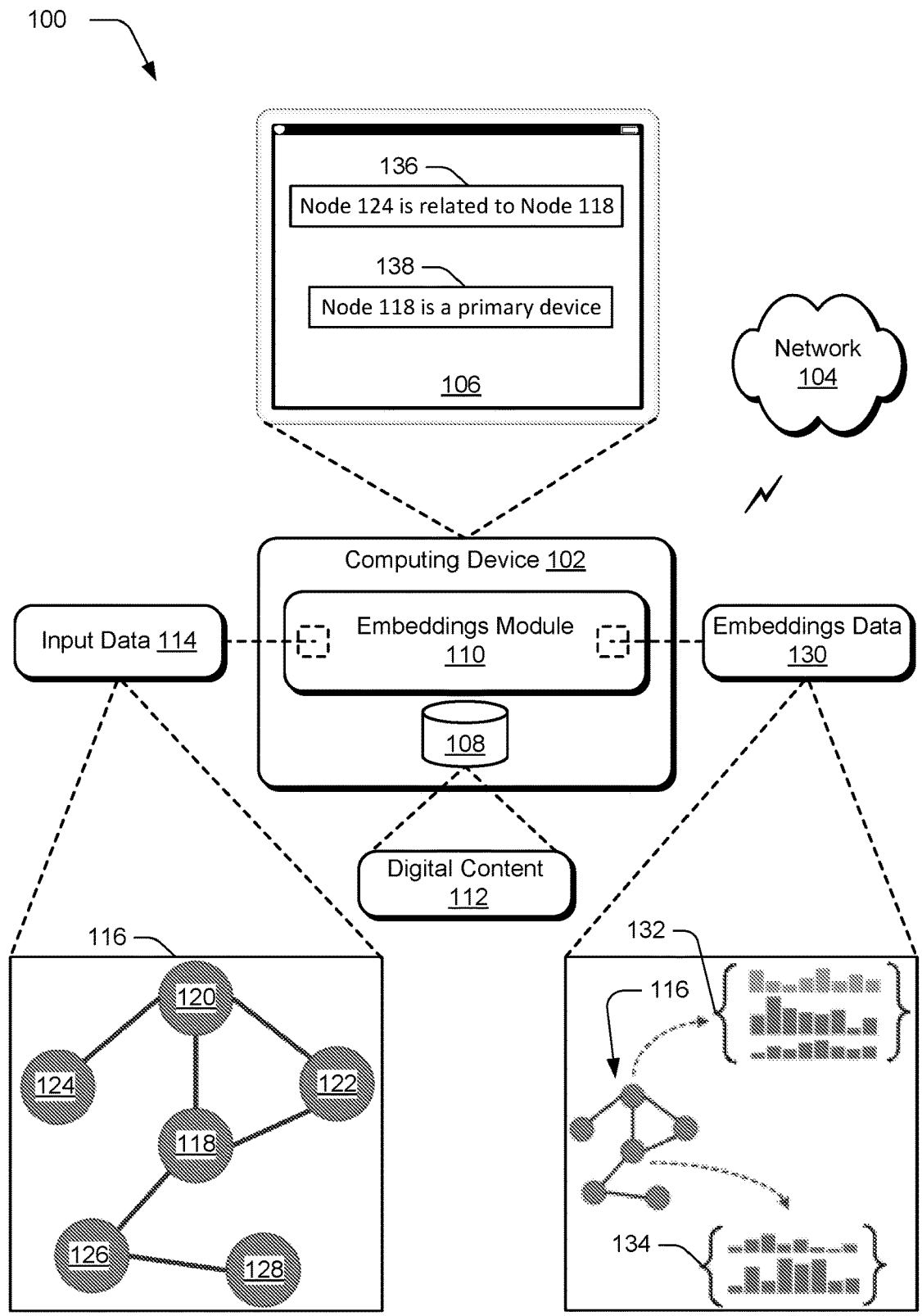
FIG. 1 is an illustration of an environment in an example implementation that is operable to employ digital systems and techniques for generating node embeddings for multiple roles as described herein.

Graph neural networks are capable of processing data describing graphs with complex topologies by simplifying the complex topologies using embeddings. Embeddings are low-dimensional vector representations of high-dimensional information included in the graph (e.g., relationships between nodes of the graph). If the embeddings are generated to represent the high-dimensional information with high fidelity in a latent space, then graph neural networks are trainable to accurately perform tasks such as link prediction or node classification for the graph.

Conventional systems for generating embeddings specify a number of embeddings to generate for each node of a graph and then generate the same specified number of embeddings for each of the nodes of the graph. By generating a same number of embeddings for each node homogeneously, the conventional systems fail to completely represent heterogeneous relationships between nodes of the graph. This is a limitation of conventional systems because nodes are known to be polysemous and exhibit different relationships with neighboring nodes in different contexts.

In order to overcome the limitations of conventional systems, techniques and systems are described for generating node embeddings for multiple roles. In an example, a computing device implements an embeddings system to receive input data describing a graph that includes nodes connected by edges or links. For instance, the nodes represent objects, groups, entities, and/or devices and the edges or links represent relationships between the objects, groups, entities, and/or devices represented by the nodes. In some examples, the embeddings system receives the input data as describing interactions between objects, groups, entities, and/or devices and the embeddings system generates the graph based on the input data using any suitable technique for representing input interaction data as a graphical data structure.

For example and regardless of whether the graph is received or generated, the embeddings system clusters the nodes of the graph into clusters using Ward's hierarchical clustering, k-means clustering, spectral clustering, etc. The embeddings system determines a maximum number of roles for the nodes of the graph based on the clusters. For instance, a role is a characteristic of a group, object, entity, or device represented by a node and exhibited by the node based on some context.

Consider an example in which first and second nodes of a graph represent first and second server devices in a failover configuration. In this example, the first node exhibits a role of a backup device based on a context in which the second server device is capable of operating normally. However, the first node exhibits a role of a primary device (e.g., to replace the second server device) based on a context in which the second server device is not capable of operating normally. Accordingly, a number of roles for the first node in this example is two (backup device and primary device).

After clustering the nodes of the graph into the clusters, the embeddings system determines the maximum number of roles for the nodes as being equal to a number of the clusters in an example. However, it is to be appreciated that the maximum number of roles for the nodes is determinable in other ways in other examples. Continuing the previous example, the embeddings system computes an initial role membership vector for each of the nodes of the graph that indicates a cluster of the clusters that includes each of the nodes.

The initial role membership vectors associate each of the nodes with an initial role corresponding to the indicated cluster and the embeddings system generates initial role embeddings for each of the nodes based on the initial roles. The embeddings system implements a graph neural network to generate a set of role embeddings for each of the nodes of the graph based on the initial role membership vectors and the initial embeddings. For instance, the embeddings system implements the graph neural network to perform two operations for each layer of the network.

In a first operation, the embeddings system implements the graph neural network to aggregate information from nodes connected to each of the nodes of the graph, and then generates an updated role membership vector for each of the nodes by updating a corresponding initial role membership vector with the aggregated information. In a second operation, the embeddings system implements the graph neural network to use the updated role membership vectors to condition the initial role embeddings of nodes connected to each of the nodes in the graph using an aggregator function. In one example, the aggregator function performs an average operation on information collected from nodes connected to each of the nodes in the graph to aggregate the information.

For example, the aggregated information is concatenated with the initial role embeddings for each of the nodes and passed through a neural network (e.g., affine transformations followed by a non-linear activation function). The embeddings system trains one neural network per layer of the graph neural network. Sets of embeddings for which role memberships are non-zero are returned by the neural network. For instance, the embeddings system then implements the graph neural network to generate a further updated role membership vector for each of the nodes by updating a corresponding updated role membership vector with information aggregated from the returned sets of embeddings for which role memberships are non-zero of nodes connected to each of the nodes in the graph.

In an example, the embeddings system uses the further updated role membership vectors to condition the sets of embeddings for which role memberships are non-zero of nodes connected to each of the nodes in the graph using the aggregator functor. In this manner, the embeddings system implements the graph neural network to iteratively perform the two operations for each layer of the network to generate a set of role embeddings for each node of the graph. Unlike conventional systems which generate a same number of embeddings for each node of a graph homogeneously, the sets of role embeddings include different numbers of role embeddings to fully represent heterogeneous relationships between nodes of the graph.

For example, a first set of role embeddings for a first node of the graph includes two role embeddings and a second set of role embeddings for a second node of the graph includes four role embeddings. In one example, the first set of role embeddings is unique in the sets of role embeddings. In another example, a role embedding included in the first set of role embeddings is not included in any of the other sets of role embeddings. By generating the sets of role embeddings for the nodes of the graph in this manner, the embeddings system ensures that each set of role embeddings includes an ideal number of embeddings for its corresponding node. As a result, the graph neural network is trainable using the sets of role embeddings to perform tasks such as link prediction or node classification for the graph with greater accuracy than if the graph neural network is trained using embeddings generated by conventional systems such that each node of the graph has a same number of embeddings. These improvements are validated in a performance comparison for link prediction and node classification between the described systems for generating node embeddings for multiple roles and multiple different conventional systems for generating node embeddings.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and an embeddings module 110. The storage device 108 is illustrated to include digital content 112 such as digital images, electronic documents, graphic artwork, etc.

The embeddings module 110 is illustrated as having, receiving, and/or transmitting input data 114. The input data 114 describes a graph 116 in this example. The graph 116 is representative of a variety of different types of graphs which are capable of representing information and/or relationships such as directed graphs, undirected graphs, cyclic graphs, acyclic graphs, labeled graphs (e.g., having additional information in labeled nodes or edges), weighted graphs, disconnected graphs, and so forth. In some examples, the input data 114 is raw data or minimally processed data describing, for example, entities and interactions between the entities, and the embeddings module 110 process the raw or minimally processed data to generate the graph 116. In one example, the input data 114 is raw or minimally processed data describing interaction logs containing queries of datasets and attributes selected in the datasets and the embeddings module 110 parses the queries and maps the datasets and the attributes to users in order to generate the graph 116.

In the illustrated example, the graph 116 includes nodes 118-128 which are connected by edges or links. The nodes 118-128 are generally representative of objects, groups, entities, or devices and the links are generally representative of relationships between the objects, groups, entities, or devices represented by the nodes 118-128. In one example, the nodes 118-128 are representative of academic publications and the links are representative of citations between the academic publications. In another example, the nodes 118-128 are representative of states or nations and the links are representative of trade agreements between the states or nations.

Consider an example in which the nodes 118-128 are representative of server devices that collectively provide cloud-based resources to remote users via the network 104 and the links are representative of failover relationships between the server devices. In this example, because node 118 is connected to node 120 by a link, a server device represented by the node 118 is capable of providing cloud-based resources to the remote users in place of cloud-based resources provided by a server device represented by the node 120 in response to an indication that the server device represented by the node 120 is no longer capable of providing the cloud-based resources to the remote users (e.g., when the node 120 is down for scheduled or unscheduled maintenance). Similarly, the server device represented by the node 120 is capable of providing cloud-based resources to the remote users in place of cloud-based resources provided by the server device represented by the node 118 in response to an indication that the server device represented by the node 118 is no longer capable of providing the cloud-based resources to the remote users.

Continuing the previous example, the embeddings module 110 processes the input data 114 to determine a number of roles for the nodes 118-128 of the graph 116. As used herein, the term "role" refers to a characteristic of a group, object, entity, or device represented by a node and exhibited by the node based on some context. For example, it is possible for a single node to exhibit multiple different roles based on different contexts. In an example in which a node represents an individual in different contexts, the node is capable of exhibiting roles of researcher, father, coach, activist, and so forth.

Consider examples in which the server device represented by the node 118 exhibits different roles based on different contexts. In a first example, the server device represented by the node 118 exhibits a role of a primary device based on a context in which the server device represented by the node 120 is capable of providing the cloud-based resources to the remote users. In this first example, the server device represented by the node 120 also exhibits a role of a primary device. In a second example, the server device represented by the node 118 exhibits a role of a secondary or backup device based on a context in which the server device represented by the node 120 is no longer capable of providing the cloud-based resources to the remote users. In the second example, the server device represented by the node 120 exhibits a role of an unavailable device. Accordingly, the role exhibited by the node 120 provides the context for the role exhibited by the node 118 in the second example. In the first and second examples, the embeddings module 110 determines a number of roles for the nodes 118, 120 as three based on the possible roles of primary device, secondary device, and unavailable device.

In some examples, the number of roles for the nodes 118-128 of the graph 116 is described by the input data 114. In other examples, the embeddings module 110 determines the number of roles for the nodes 118-128 of the graph 116 by clustering the nodes 118-128 into clusters. For instance, the embeddings module 110 clusters the nodes 118-128 into clusters using Ward's hierarchical clustering, k-means clustering, spectral clustering, etc. In an example, the embeddings module 110 determines the number of roles for the nodes 118-128 as being equal to a number of the clusters.

For example, the embeddings module 110 computes an initial role membership vector for each of the nodes 118-128 as indicating a cluster which contains each of the nodes 118-128 after the clustering. In one example, the initial role membership vectors associate each of the nodes 118-128 with a particular initial role corresponding to one of the clusters. In this example, ones of the nodes 118-128 included in a same cluster have a same initial role membership vector. Continuing the example, the embeddings module 110 generates initial role embeddings for each of the nodes 118-128 based on the initial role membership vectors.

In some examples, the embeddings module 110 leverages the initial role embeddings and the initial role membership vectors to generate a set of role embeddings for each of the nodes 118-128. To do so, the embeddings module 110 leverages a machine learning model such as graph neural network to generate embeddings data 130 based on the graph 116, the initial role membership vectors for each of the nodes 118-128, and the initial role embeddings for each of the nodes 118-128. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

To generate the embeddings data 130 in one example, the embeddings module 110 implements the graph neural network to perform two updates for each layer of the graph neural network. For example, the embeddings module 110 generates an updated role membership vector for each of the nodes 118-128 by updating a corresponding initial role membership vector with information aggregated from nodes connected to each of the nodes 118-128 in the graph 116. In this example, the embeddings module 110 updates an initial role membership vector for the node 118 with information aggregated from nodes 120, 122, 126; the embeddings module 110 updates an initial role membership vector for the node 120 with information aggregated from nodes 118, 122, 124; the embeddings module 110 updates an initial role membership vector for the node 122 with information aggreged from nodes 118, 120; the embeddings module 110 updates an initial role membership vector for the node 122 with information aggregated from the node 120; the embeddings module 110 updates an initial role membership vector for the node 126 with information aggregated from nodes 118, 128; and the embeddings module 110 updates an initial role membership vector for the node 128 with information aggregated from the node 126.

The embeddings module 110 uses the updated role membership vectors for the nodes 118-128 to condition the initial role embeddings of nodes connected to each of the nodes 118-128 in the graph 116 using an aggregator function. In one example, the aggregator function is a mean aggregator function that performs an average operation on information collected from nodes connected to each of the nodes 118-128 in the graph 116. The aggregated information is concatenated with the initial role embeddings for each of the nodes 118-128 and passed through a neural network (e.g., affine transformations followed by a non-linear activation function). For example, one neural network is trained per layer of the graph neural network and sets of embeddings for which role memberships are non-zero are returned from the neural network.

The embeddings module 110 then generates a further updated role membership vector for each of the nodes 118-128 by updating a corresponding updated role membership vector with information aggregated from the returned sets of embeddings for which role memberships are non-zero of nodes connected to each of the nodes 118-128 in the graph 116. For example, the embeddings module 110 uses the further updated role membership vectors for the nodes 118-128 to condition the sets of embeddings for which role memberships are non-zero of nodes connected to each of the nodes 118-128 in the graph 116 using the aggregator function. In this example, the embeddings module 110 implements the graph neural network to iteratively perform the two updates for each layer of the graph neural network to generate the embeddings data 130.

As illustrated in FIG. 1, the embeddings data 130 describes the graph 116 and sets of role embeddings for each of the nodes 118-128. For example, a set of role embeddings 132 for the node 120 includes three different role embeddings. In another example, a set of role embeddings 134 for the node 118 includes two different role embeddings. As shown, each of the two role embeddings included in the set of role embeddings 134 is different from each of the three role embeddings included in the set of role embeddings 132.

Accordingly, embeddings module 110 generates the set of role embeddings 132 for the node 120 to automatically include an appropriate number of role embeddings based on the nodes 118, 122, 124 connected to the node 120 in the graph 116. Similarly, the embeddings module 110 generates the set of role embeddings 134 for the node 118 to automatically include an appropriate number of role embeddings based on the nodes 120, 122, 126 connected to the node 118 in the graph 116. Although the sets of role embeddings 132, 134 are illustrated to include different numbers of different role embeddings in this example, it is to be appreciated that in other examples, the embeddings module 110 is capable of generating a same number of different role embeddings for the sets of role embeddings 132, 134. For example, the embeddings module 110 is also capable of generating the sets of role embeddings 132, 134 as including a same number of similar or identical role embeddings in different contexts.

By generating the embeddings data 130 in this way, the set of role embeddings 132 includes an ideal number of role embeddings for the node 120 and the set of role embeddings 134 includes an ideal number of role embeddings for the node 118 to accurately perform downstream tasks such as link prediction for the graph 116 and node classification for the graph 116. This is not possible using conventional systems for generating node embeddings which are limited to generating a same number of embeddings for each node of a graph. In one example, the embeddings module 110 processes the embeddings data 130 to generate a single embedding for each the nodes 118-128. In this example, the embeddings module 110 scales each role embedding included in the set of role embeddings for each of the nodes 118-128 using the role membership vector for each of the nodes 118-128 and concatenates the scaled embeddings into a single embedding for each the nodes 118-128.

For example, using the single embeddings for each the nodes 118-128 and the graph neural network, the embeddings module 110 generates an indication 136 of a link prediction which is displayed in a user interface of the display device 106. The indication 136 conveys that "Node 124 is related to Node 118" which corresponds to a predicted link between the nodes 118, 124. For instance, the embeddings module 110 also generates an indication 138 of a node classification which is also displayed in the user interface of the display device 106. As shown, the indication 138 conveys that "Node 118 is a primary device" which corresponds to a predicted classification of the node 118 in an example in which the node 118 represents the server device.

Figure 2:
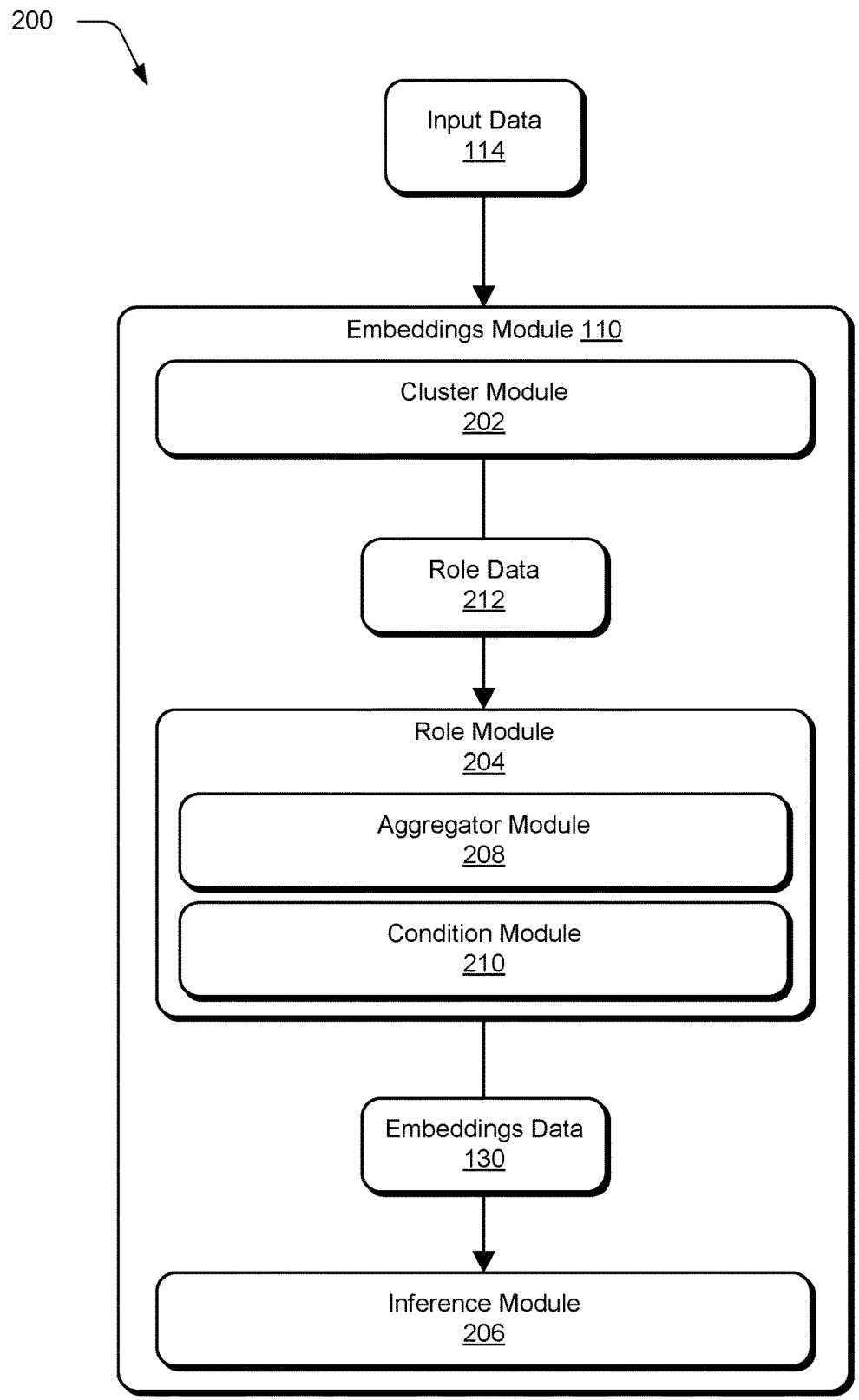
FIG. 2 depicts a system in an example implementation showing operation of an embeddings module for generating node embeddings for multiple roles.

FIG. 2 depicts a system 200 in an example implementation showing operation of an embeddings module 110. The embeddings module 110 is illustrated to include a cluster module 202, a role module 204, and an inference module 206. For example, the role module 204 includes an aggregator module 208 and a condition module 210. The embeddings module 110 is illustrated as receiving the input data 114 as an input. In one example, the computing device 102 implements embeddings module 110 to generate sets of role embeddings for nodes of a graph. In this example, this is representable as:

$$G=(V,\varepsilon)$$

$$X_v=\{x_1,x_2,\ldots\} \text{ for } v \in V$$

$$u,v \in V, |X_u| \neq |X_v| \tag{i}$$

$$|X_u \cup X_v| = |X_u| + |X_v| \tag{ii}$$

where: G represents a graph having nodes V connected by links $\varepsilon$; $X_v$ is a set of multiple role embeddings $\{x_1, x_2, \ldots\}$ each of a fixed size D, e.g., $(x_i \in X_v) \in \mathbb{R}^D$; and u, v represent any two nodes of graph G.

Figure 3:
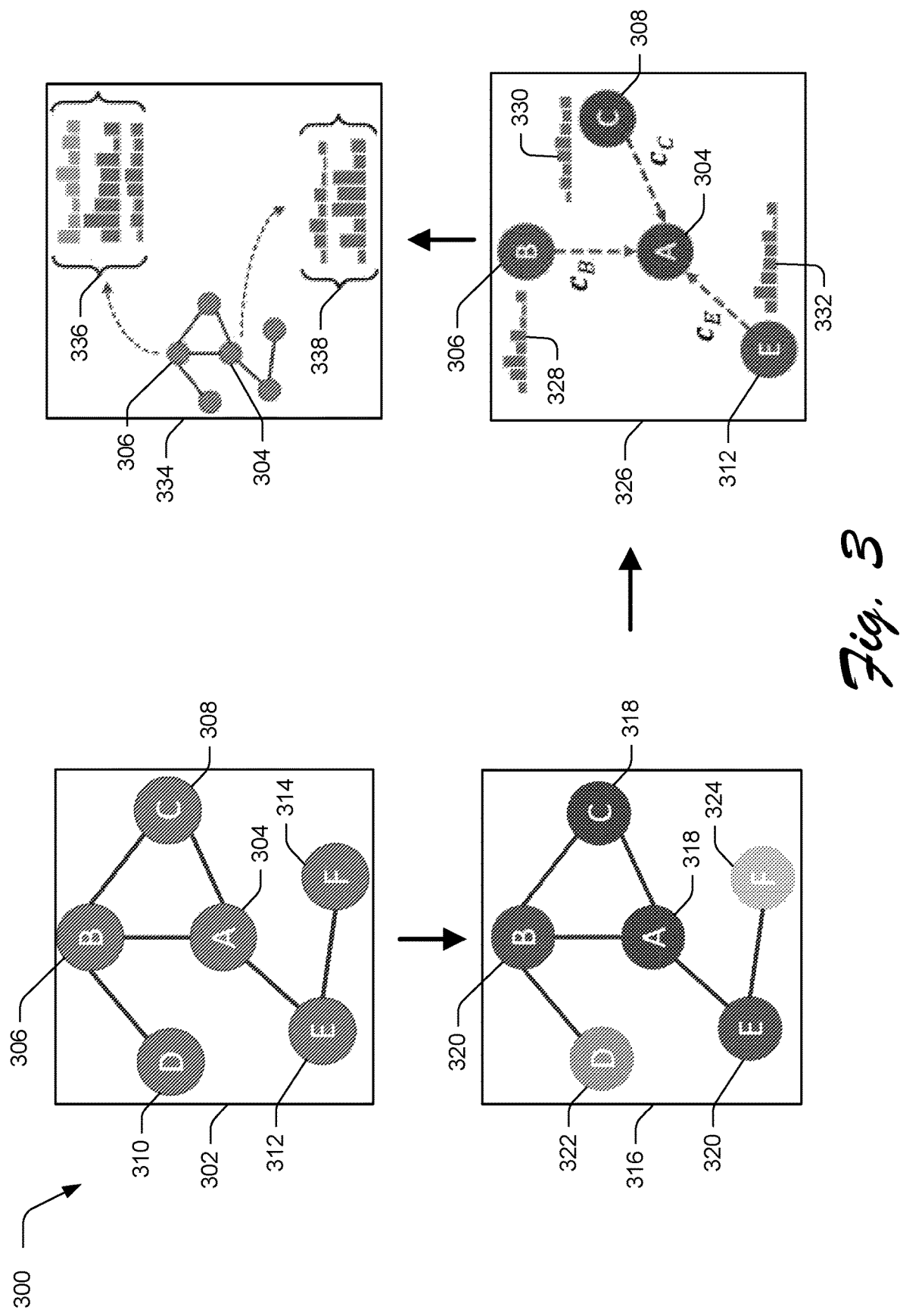
FIG. 3 illustrates a representation of generating node embeddings for multiple roles.

FIG. 3 illustrates a representation 300 of generating node embeddings for multiple roles. The cluster module 202 receives the input data 114 which describes a graph 302, and the cluster module 202 processes the input data 114 to generate role data 212. To do so in one example, the cluster module 202 clusters nodes 304-314 of the graph 302 into clusters.

In this example, the cluster module 202 clusters the nodes 304-314 into clusters using Ward's hierarchical clustering, k-means clustering, spectral clustering, etc. For instance, the cluster module 202 generates the role data 212 as describing the clusters 316 of the nodes 304-314. As shown, a first cluster 318 described by the role data 212 includes nodes 304, 308; a second cluster 320 described by the role data 212 includes nodes 306, 312; a third cluster 322 described by the role data 212 includes node 310; and a fourth cluster 324 described by the role data 212 includes node 314.

The role module 204 receives and processes the role data 212 to generate embeddings data 130. To do so in one example, the role module 204 leverages a graph neural network and the role module 204 implements the aggregator module 208 to perform a first operation and the condition module 210 to perform a second operation for each layer l of the graph neural network. For instance, the role module 204 determines a maximum number of role embeddings K for each of the nodes 304-314 as being equal to a number of the clusters described by the role data 212. In this example, the role module 204 determines that K=4. The role module 204 generates an initial role membership vector $c_v$ for each of the nodes 304-314 based on the clusters 318-324. In one example, this is representable as:

$$c_v = e_i \in \{0,1\}^K$$

where: v is a node belonging to cluster i; and $c_v$ is a one-hot encoded vector.

For example, the role module 204 generates an initial role embedding for each of the nodes 304-314 using the corresponding initial role membership vector $c_v$ to avoid bias. For each layer l of the graph neural network, the role module 204 implements the aggregator module 208 to compute an updated role membership vector for each of the nodes 304-314 by aggregating information from neighboring nodes N (v) that are connected to each of the nodes 304-314 in the graph 302. This is illustrated with respect to the node 304 in a representation 326 of aggregating information from neighboring nodes N (v). The role module 204 and/or the aggregator module 208 aggregate information 328 from the node 306, information 330 from the node 308, and information 332 from the node 312 for the node 304.

The role module 204 implements the condition module 210 to use the updated role membership vector to condition role embeddings of a previous layer l of the graph neural network for neighboring nodes N(v) that are connected to a reference node v in the graph 302 before applying a suitable aggregator function. In one example, this is representable as:

$$X_{u,i}^{l-1}, u \in N(v)$$

The role module 204 leverages an aggregator function to collect and transmit important and combined information from neighboring nodes N(v) to a given node v. Because this information aggregation is not tied to a specific order, the aggregator function is order invariant. For example, the role module 204 is capable of leveraging different aggregator functions which are order invariant and which each describe how role membership values $c_u \in \mathbb{R} \geq 0$ combine with corresponding role embeddings $x_u \in \mathbb{R}^D$ and interact in a neighborhood N(v) of node v. A mean aggregator function performs an average operation of information collected from neighbors which is representable as:

$$f_{aggregate}(\{(c_u, x_u \mid u \in N(v)\}) = \frac{\sum_{u \in N(v)} c_u \cdot x_u}{|N(v)|}$$

A sum aggregator function sums up information collected from neighbors which is representable as:

$$f_{aggregate}(\{(c_u, x_u \mid u \in N(v)\}) = \sum_{u \in N(v)} c_u \cdot x_u$$

A max aggregator function performs an element-wise max operation of neighboring node vectors which is representable as:

$$f_{aggregate}(\{(c_u, x_u \mid u \in N(v)\}) = \left[ \max_{u \in N(v)} (c_u \cdot x_u, 1), \ldots \right]$$

For example, the role module 204 concatenates the aggregated information from neighbors' i-th role $h_{N(v),i}^l$ with the node's own i-th role embedding $\{X_{v,i}^{l-1}\}$ which is then passed through a neural network (affine transformations followed by a non-linear activation function $\sigma(\bullet)$ such as Sigmoid) where $W^l$ denotes learnable weight matrices of this neural network. In an example, a single neural network is trained per layer l and is the same for each role. A set of embeddings for which role memberships are non-zero is returned by the neural network.

In this manner, the role module 204 disentangles node embeddings as a set of multiple role embeddings conditioned by a role membership vector. This is illustrated in a representation 334 which includes a set 336 of role embeddings for the node 306 and a set 338 of role embeddings for the node 304. For instance, the set 336 includes three different role embeddings and the set 338 includes two different role embeddings and the five role embeddings collectively included in the sets 336, 338 are each unique. Notably, although the maximum number of role embeddings is four (K=4) in the previous example, an ideal number of role embeddings is included in the set of role embeddings for each of the nodes 304-314 which is two for the node 304 and three for the node 306. However, it is to be appreciated that the ideal number of role embeddings for any particular pair of the nodes 304-314 could be a same number or a different number. Similarly, particular role embeddings included in the set 336 could be identical or similar to particular role embeddings included in the set 338, or each role embedding included in the sets 336, 338 might be unique in different contexts.

For practical usage in downstream tasks, the role module 204 obtains a single embedding of a fixed length for each of the nodes 304-314. To do so in one example, the role module 204 scales the role embeddings of each of the nodes 304-314 using the role membership vector for each of the nodes 304-314 and concatenates the scaled role embeddings. In some examples, this is representable as:

$$\widetilde{X}_v = (C_{v,1} \cdot X_{v,1}) \oplus (C_{v,2} \cdot X_{v,2}) \oplus \ldots \oplus (C_{v,1} \cdot X_{v,1})$$

For example, the role module 204 generates the embeddings data 130 as describing a single embedding of the fixed length for each of the nodes 304-314. The inference module 206 receives and processes the embeddings data 130 to perform tasks such as node classification and link prediction for the graph 302. For link prediction, the inference module 206 computes a similarity score between two nodes u, v as an inner vector product: sim(u, v)= $\widetilde{X_u} \odot \widetilde{X_v}$. For node classification, the inference module 206 feeds the node embeddings $\widetilde{X_v}$ to a neural network to learn node labels. For both link prediction and node classification, a standard loss function (e.g., cross-entropy loss) is used in backpropagation to learn weight parameters.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
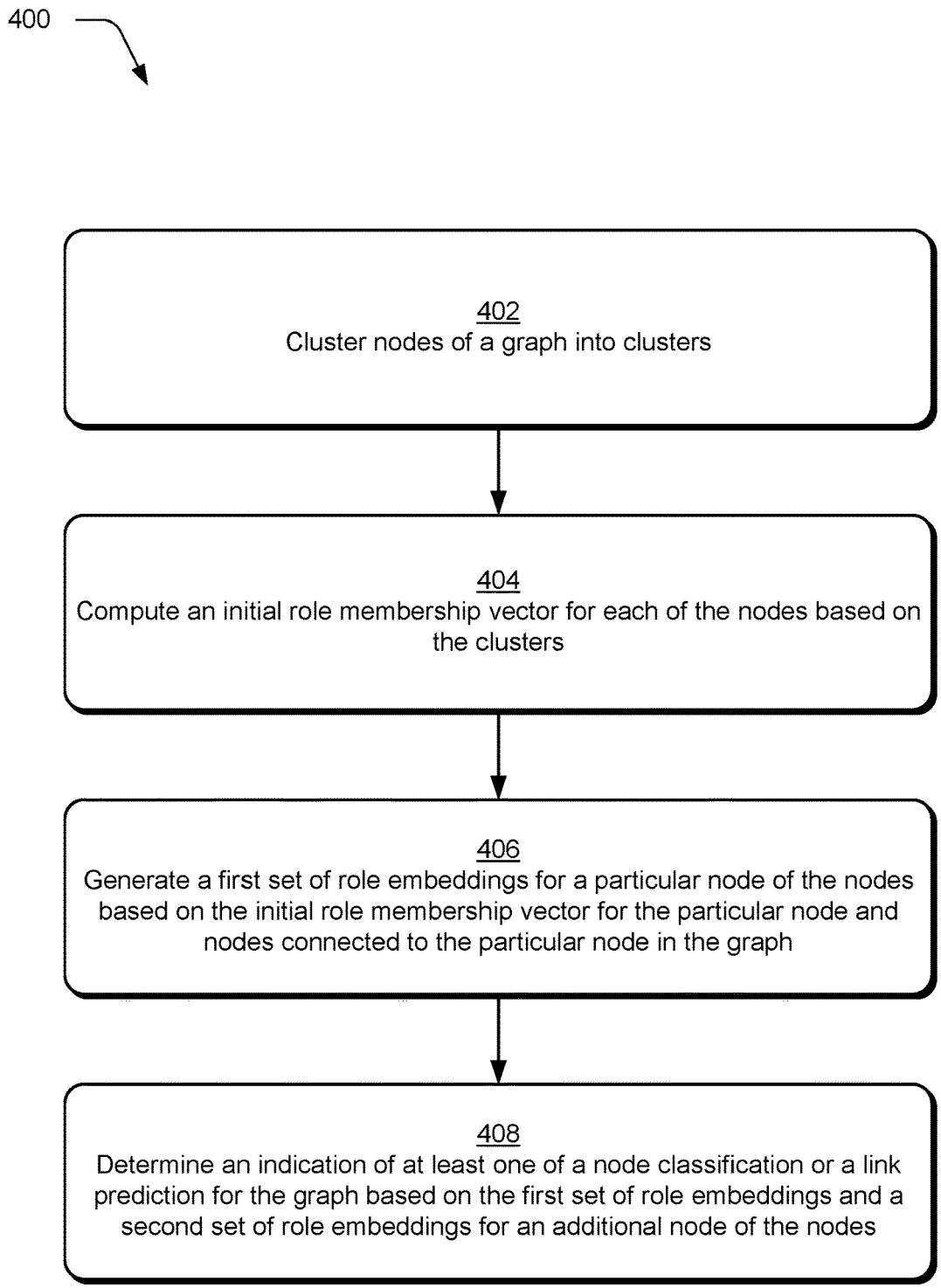
FIG. 4 is a flow diagram depicting a procedure in an example implementation in which an indication of at least one of a node classification or a link prediction for a graph determined based on sets of role embeddings for nodes of the graph.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which an indication of at least one of a node classification or a link prediction for a graph determined based on sets of role embeddings for nodes of the graph.

Nodes of a graph are clustered into clusters (block 402). For example, the computing device 102 implements the embeddings module 110 to cluster the nodes of the graph into the clusters. An initial role membership vector is computed for each of the nodes based on the clusters (block 404). The embeddings module 110 computes the initial role membership vector for each of the nodes in one example.

A first set of role embeddings is generated for a particular node of the nodes based on the initial role membership vector for the particular node and nodes connected to the particular node in the graph (block 406). In an example, the computing device 102 implements the embeddings module 110 to generate the first set of role embeddings for the particular node. An indication of at least one of a node classification or a link prediction for the graph is determined based on the first set of role embeddings and a second set of role embeddings for an additional node of the nodes (block 408). In some examples, the embeddings module 110 determines the indication of at least one of the node classification or the link prediction for the graph.

Figure 5:
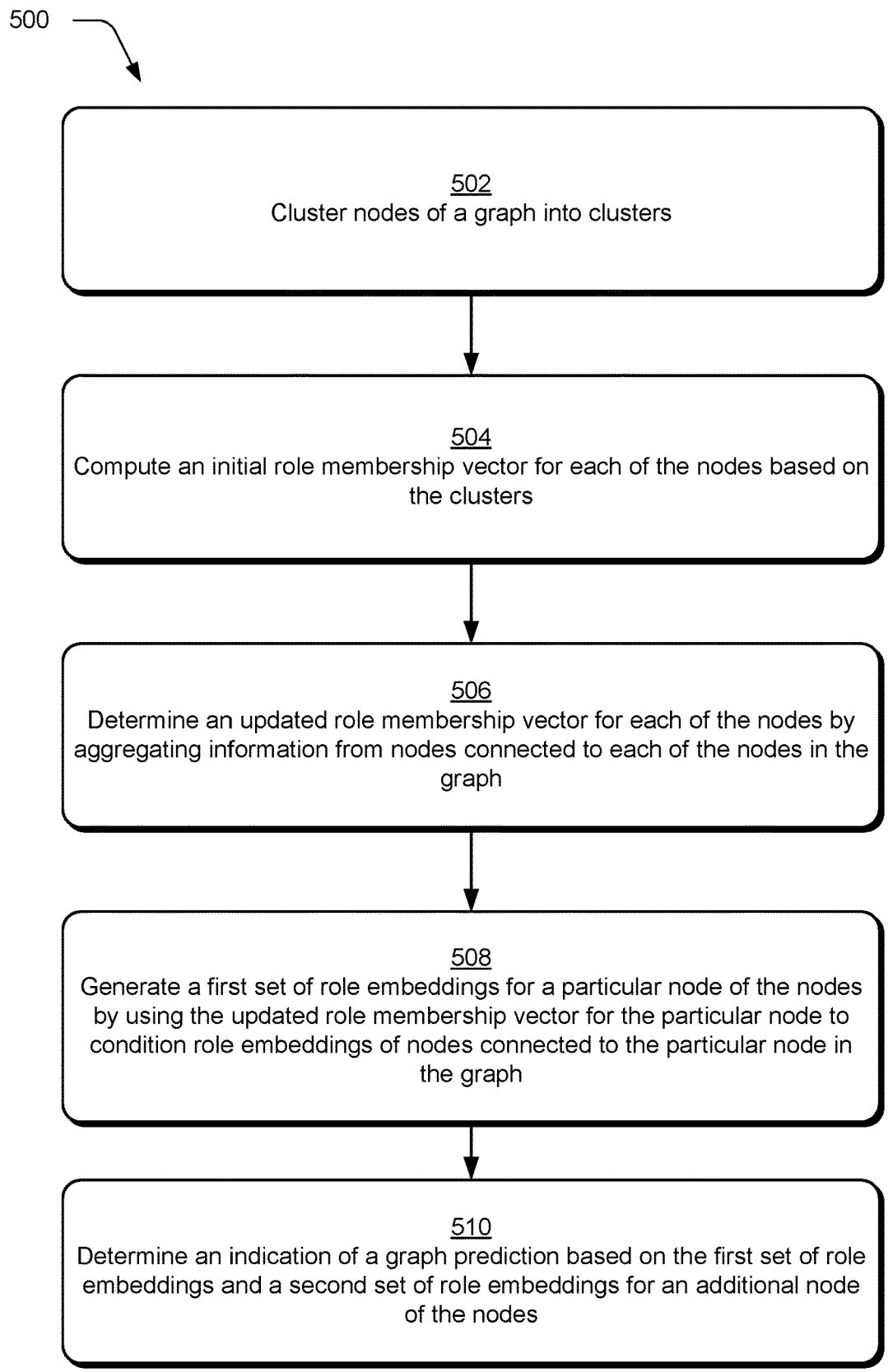
FIG. 5 is a flow diagram depicting a procedure in an example implementation in which an indication of a graph prediction for a graph is determined based on a first set of role embeddings for a particular node of the graph and a second set of role embeddings for an additional node of the graph.

FIG. 5 is a flow diagram depicting a procedure 500 in an example implementation in which an indication of a graph prediction for a graph is determined based on a first set of role embeddings for a particular node of the graph and a second set of role embeddings for an additional node of the graph. Nodes of a graph are clustered into clusters (block 502). For example, the embeddings module 110 clusters the nodes of the graph into the clusters. An initial role membership vector is computed for each of the nodes based on the clusters (block 504). In one example, the computing device 102 implements the embeddings module 110 to compute the initial role membership vector for each of the nodes.

An updated role membership vector is determined for each of the nodes by aggregating information from nodes connected to each of the nodes in the graph (block 506). The embeddings module 110 determines the updated role membership vector for each of the nodes in some examples. A first set of role embeddings is generated for a particular node of the nodes by using the updated role membership vector for the particular node to condition role embeddings of nodes connected to the particular node in the graph (block 508). In an example, the embeddings module 110 generates the first set of role embeddings. An indication of a graph prediction is determined based on the first set of role embeddings and a second set of role embeddings for an additional node of the nodes (block 510). For example, the computing device 102 implements the embeddings module 110 to determine the indication of the graph prediction.

Figure 6:
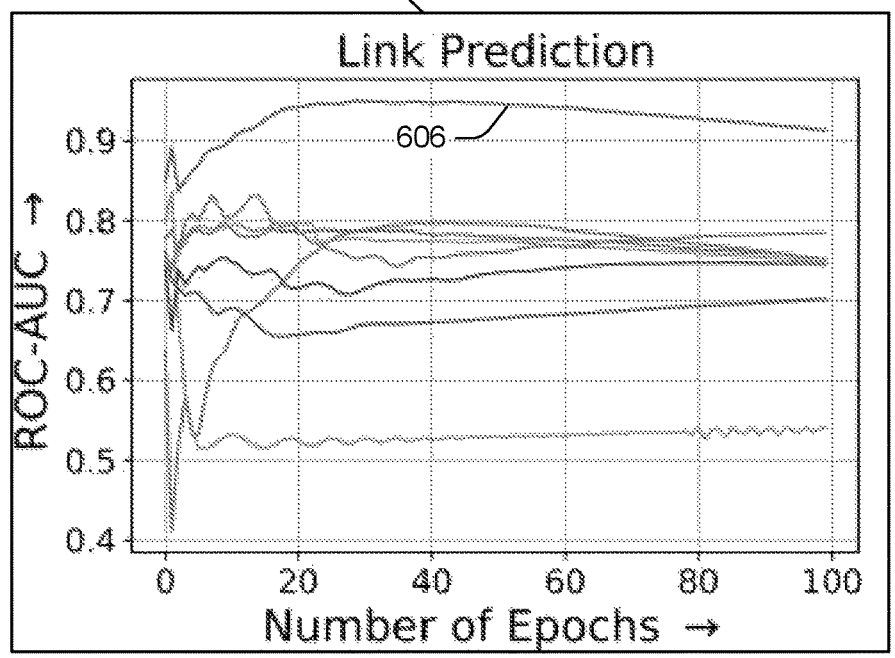
FIG. 6 illustrates a representation of improvements for link predictions and node classifications performed by the described systems compared to conventional systems for generating node embeddings.
Figure 6:
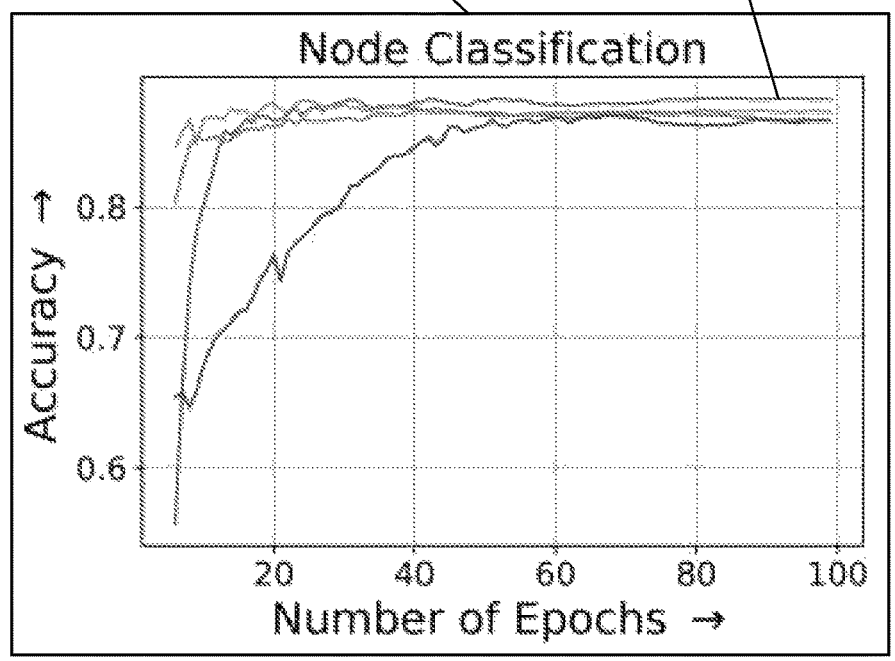

FIG. 6 illustrates a representation 600 of improvements for link predictions and node classifications performed by the described systems compared to conventional systems for generating node embeddings. As shown, the representation includes performance comparisons between the described systems for generating node embeddings for multiple roles and conventional systems for generating node embeddings for link prediction 602 and node classification 604. The performance comparisons are based on a dataset of scientific publications which are represented by nodes of a graph that are connected with links that define a citation relationship. For example, if one publication represented by a first node cites another publication represented by a second node, then the first and second nodes are connected by a link in the graph. Each of the nodes is represented by a fixed-length vector derived using a bag-of-words representation of the publication.

ROC-AUC of the described systems 606 for link prediction 602 is presented relative to ROC-AUC of various conventional systems for generating node embeddings versus numbers of epochs used in training. As shown, the ROC-AUC of the described systems 606 is greater than the ROC-AUC of the various conventional systems across all numbers of epochs. Accuracy of the described systems 608 for node classification 604 is presented relative to accuracy of various conventional systems for generating node embeddings versus numbers of epochs used in training. As shown, the accuracy of the described systems 608 is greater than the accuracy of the various conventional systems for numbers of epochs greater than or equal to 40. Further, the accuracy of the described systems 608 is similar to the accuracy of the various conventional systems for numbers of epochs less than 40.

Example System and Device

Figure 7:
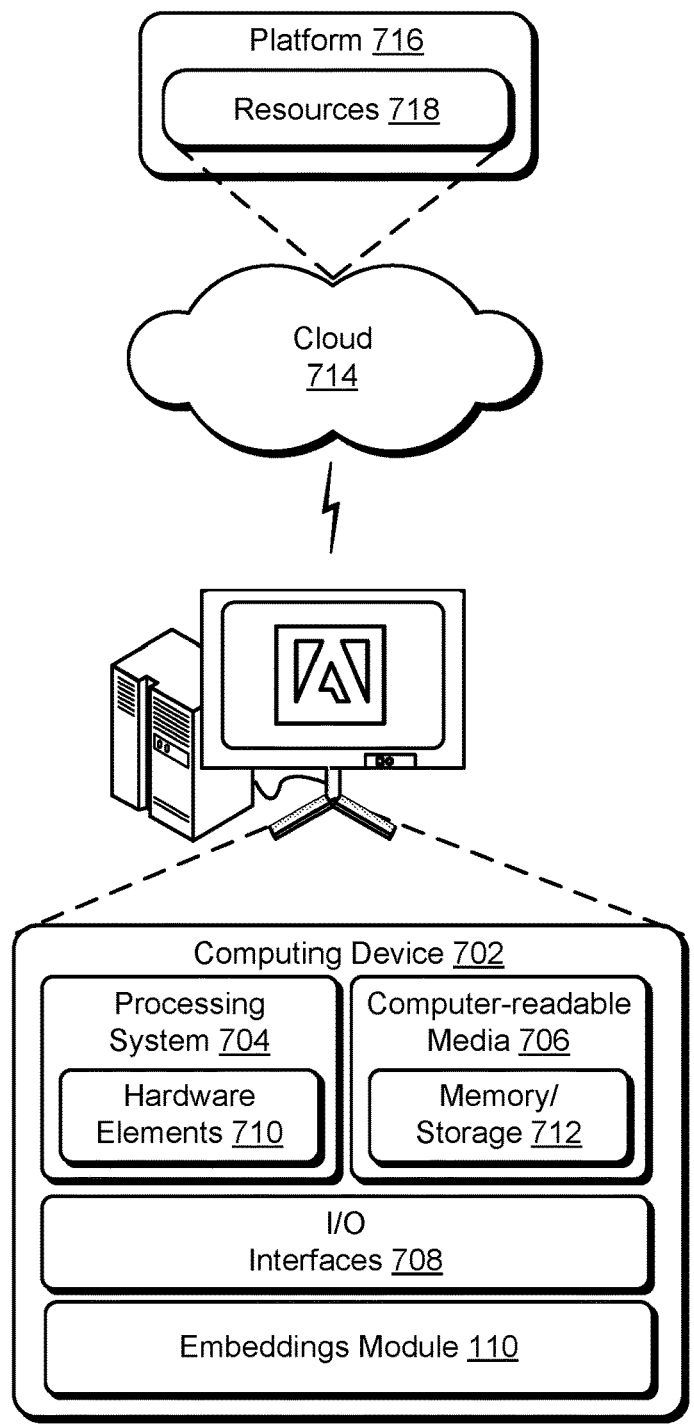
FIG. 7 illustrates an example system that includes an example computing device that is representative of one or more computing systems and/or devices for implementing the various techniques described herein.

FIG. 7 illustrates an example system 700 that includes an example computing device that is representative of one or more computing systems and/or devices that are usable to implement the various techniques described herein. This is illustrated through inclusion of the embeddings module 110. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage 712 includes volatile media (such as random access memory (RAM)) and/or nonvolatile media (such as read only memory (ROM), Flash memory, optical disks, magnetic disks, and so forth). In another example, the memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

What is claimed is:

1. A method comprising:
    clustering, by a processing device, nodes of a graph into clusters;
    computing, by the processing device, an initial role membership vector for each of the nodes based on the clusters;
    generating, by the processing device, a first set of role embeddings for a first node of the nodes based on the initial role membership vector for the first node and nodes connected to the first node in the graph;
    generating, by the processing device, a second set of role embeddings for a second node of the nodes based on the initial role membership vector for the second node and nodes connected to the second mode in the graph, in which, a number of role embeddings in the first set of role embeddings is different from a number of role embeddings in the second set of role embeddings;
    determining, by the processing device, a node classification as a label for the first node based on the first set of role embeddings and the second set of role embeddings for the second node of the nodes; and
    presenting, by the processing device, the label for the first mode for display in a user interface.

2. The method as described in claim 1, wherein the first set of role embeddings is unique to the first node in the graph.

3. The method as described in claim 1, wherein a role embedding included in the first set of role embeddings is unique to the first node in the graph.

4. The method as described in claim 1, wherein the nodes of the graph are clustered into the clusters using at least one of Ward's hierarchical clustering, k-means clustering, or spectral clustering.

5. The method as described in claim 1, further comprising determining an updated role membership vector for the first node by aggregating information from the nodes connected to the first node in the graph using an order invariant aggregator function.

6. The method as described in claim 5, further comprising:
    computing scaled role embeddings by scaling each role embedding included in the first set of role embeddings using the updated role membership vector; and
    concatenating the scaled role embeddings into a single embedding of a fixed length for the first node.

7. The method as described in claim 1, wherein a role embedding included in the first set of role embeddings is not included in the second set of role embeddings.

8. A system comprising:
    a memory component; and
    a processing device coupled to the memory component, the processing device to perform operations comprising:
    clustering nodes of a graph into clusters;
    computing an initial role membership vector for each of the nodes based on the clusters;
    determining an updated role membership vector for each of the nodes by aggregating information from nodes connected to each of the nodes in the graph using an order invariant aggregator function;
    generating a first set of role embeddings for a first node of the nodes by using the updated role membership vector for the first node to condition role embeddings of nodes connected to the first node in the graph;
    determining an indication of a graph prediction based on the first set of role embeddings and a second set of role embeddings for a second node of the nodes; and
    resending the indication for display in a user interface.

9. The system as described in claim 8, wherein the indication of the graph prediction is at least one of a node classification or a link prediction for the graph.

10. The system as described in claim 8, wherein the first set of role embeddings is unique to the first node in the graph.

11. The system as described in claim 8, wherein a role embedding included in the first set of role embeddings is unique to the first node in the graph.

12. The system as described in claim 8, wherein the nodes of the graph are clustered into the clusters using at least one of Ward's hierarchical clustering, k-means clustering, or spectral clustering.

13. The system as described in claim 8, wherein a number of role embeddings in the first set of role embeddings is less than or equal to a number of the clusters.

14. The system as described in claim 8, wherein a number of role embeddings in the first set of role embeddings is different from a number of role embeddings in the second set of role embeddings.

15. The system as described in claim 8, further comprising generating the second set of role embeddings for the second node of the nodes based on the initial role membership vector for the second node and nodes connected to the second node in the graph, in which, a number of role embeddings in the first set of role embeddings is different from a number of role embeddings in the second set of role embeddings.

16. A non-transitory computer-readable storage medium storing executable instructions, which when executed by a processing device, cause the processing device to perform operations comprising:
  clustering nodes of a graph into clusters;
  computing an initial role membership vector for each of the nodes based on the clusters;
  generating a first set of role embeddings for a first node of the nodes based on the initial role membership vector for the first node and nodes connected to the first node in the graph;
  generating, by processing device, a second set of role embeddings for a second mode of the nodes based on the initial role membership vector for the second mode and nodes connected to the second node in the graph, in which, a number of role embeddings in the first set of role embeddings is different from a number of role embeddings in the second set of role embeddings; and
  determining a link prediction for the graph based on the first set of role embeddings and the second set of role embeddings for the second node of the nodes, the link prediction predicting whether a connection exists between the first and second nodes of the graph; and
  presenting the link prediction for display in a user interface.

17. The non-transitory computer-readable storage medium as described in claim 16, wherein the operations further comprise determining an updated role membership vector for the first node by aggregating information from the nodes connected to the first node in the graph using an order invariant aggregator function.

18. The non-transitory computer-readable storage medium as described in claim 16, wherein the first set of role embeddings is unique to the first node in the graph.

19. The non-transitory computer-readable storage medium as described in claim 16, wherein a role embedding included in the first set of role embeddings is unique to the first node in the graph.

20. The non-transitory computer-readable storage medium as described in claim 16, wherein a role embedding included in the first set of role embeddings is not included in the second set of role embeddings.

* * * * *